United States Patent [19]

van der Merwe et al.

[11] Patent Number: 4,860,454
[45] Date of Patent: Aug. 29, 1989

[54] SELF-PROPELLED, SELF-STEERED VEHICLE FOR POWER DRIVEN PLANT TRIMMING TOOLS

[76] Inventors: Jacobus C. van der Merwe; Lucas C. van der Merwe, both of 801 Beechwood Dr., Kingsport, Tenn. 37663

[21] Appl. No.: 67,862

[22] Filed: Jun. 30, 1987

Related U.S. Application Data

[63] Continuation-in-part of Ser. No. 886,801, Jul. 18, 1986, Pat. No. 4,694,577.

[51] Int. Cl.⁴ .............................................. B23D 45/20
[52] U.S. Cl. .................................... 30/379.5; 56/234; 280/776
[58] Field of Search ................... 30/180, 379.5, 296 R, 30/278; 56/233, 234, 328 R, 39; 280/776; 104/244.1

[56] References Cited

U.S. PATENT DOCUMENTS

| | | |
|---|---|---|
| 1,424,669 | 8/1922 | Neely . |
| 1,723,073 | 8/1929 | Poll . |
| 2,228,635 | 1/1941 | Magennis . |
| 3,517,496 | 6/1970 | Kemp et al. . |
| 3,692,119 | 9/1972 | Tucker . |
| 3,834,020 | 9/1974 | Caire . |
| 4,347,908 | 9/1982 | Anderson . |
| 4,411,070 | 10/1983 | Boyum et al. . |
| 4,541,177 | 9/1985 | Hollander . |
| 4,694,577 | 9/1987 | van der Merwe et al. ........ 30/379.5 |

FOREIGN PATENT DOCUMENTS

698437 10/1953 United Kingdom .

Primary Examiner—Frank T. Yost
Assistant Examiner—Willmon Fridie, Jr.
Attorney, Agent, or Firm—Fleit, Jacobson, Cohn, Price, Holman & Stern

[57] ABSTRACT

A self-propelled, self-steered vehicle for carrying a source of pressurized fluid to power and operate a plurality of manually controlled trimming tools for trimming plants in a cultivated field. The vehicle may have one of two steering devices. One steering device includes a steering lever connected to a steered wheel carrier. The steering lever includes a cable guiding element which cooperates with a guiding cable passing therethrough to constantly orient the steering lever towards an anchored end of the cable so that the wheeled vehicle automatically follows the entire unwound length of the guiding cable. Another steering device includes feelers extending outwardly of the vehicle to contact fixed objects to cause, by cooperation of the feelers with sprockets, steered wheels of the vehicle to turn away from a fixed object contacted by a feeler. Additionally, pressurized fluid from the pressurized fluid source is passed through moisture trapping baffles fitted in the supporting frame of the vehicle. The moisture content of the pressurized fluid is thereby minimized to avoid the presence of ice in connecting air conduits and freeze up of trimming tools.

19 Claims, 4 Drawing Sheets

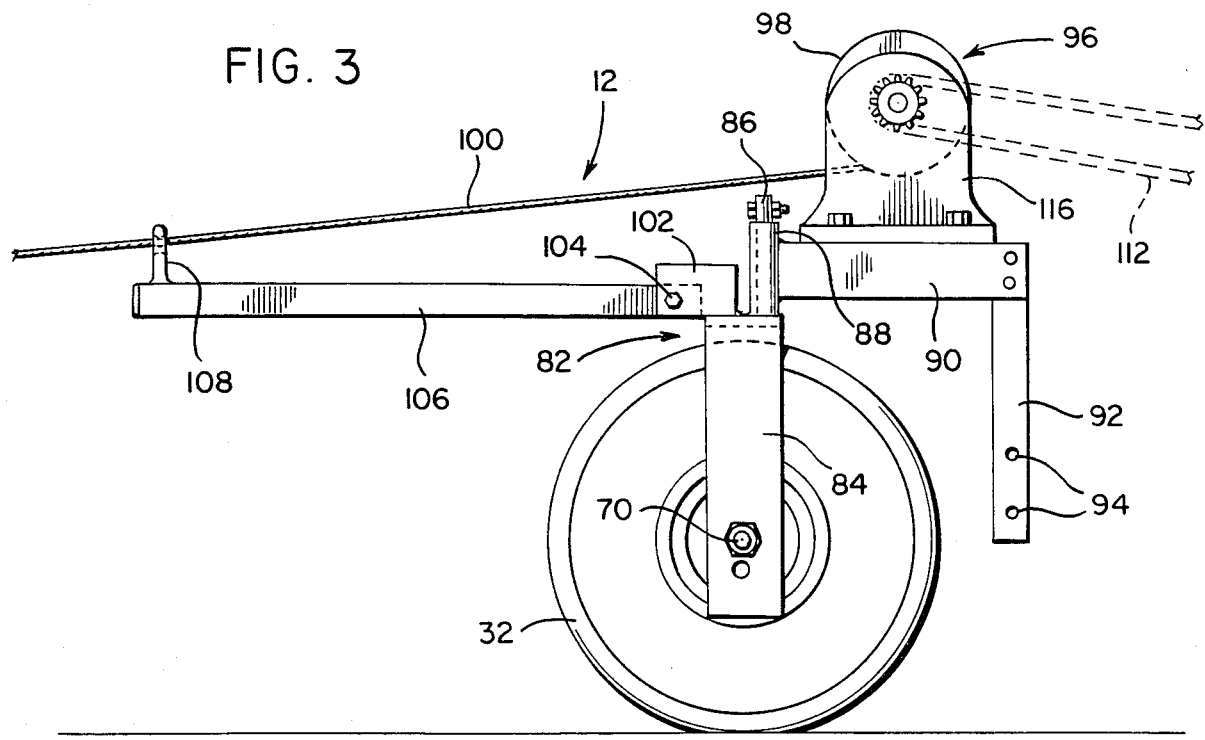
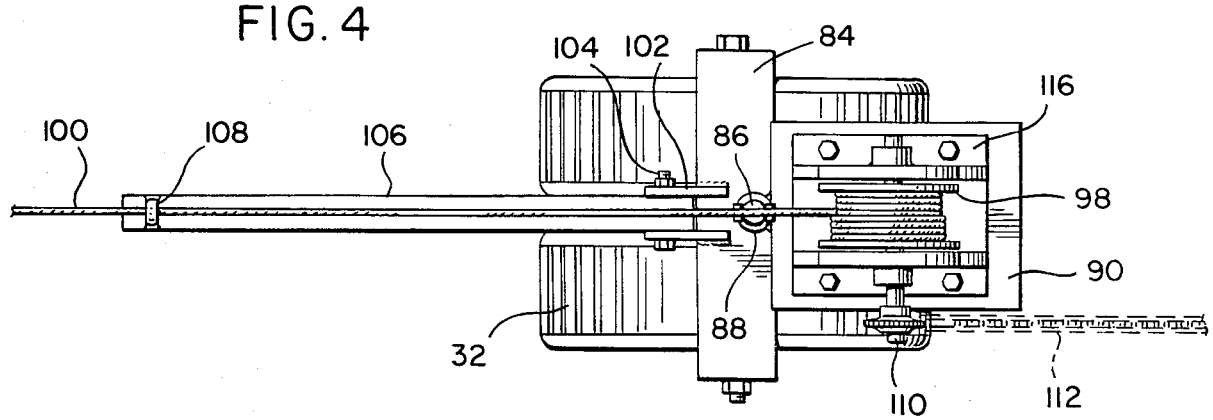
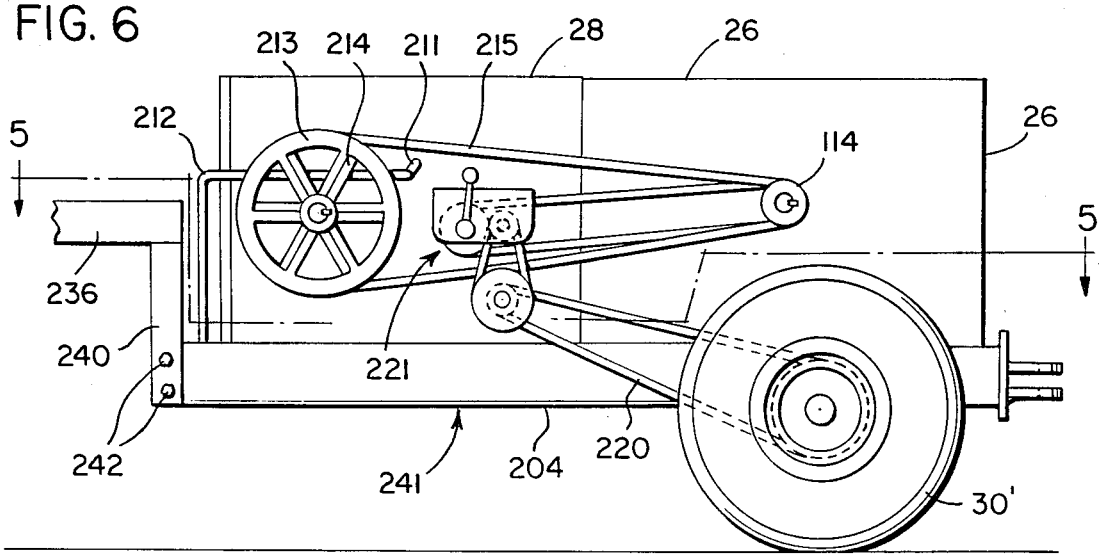

SELF-PROPELLED, SELF-STEERED VEHICLE FOR POWER DRIVEN PLANT TRIMMING TOOLS

This application is a continuation-in-part of application Ser. No. 886,801, filed July 18, 1986, now U.S. Pat. No. 4,694,577.

BACKGROUND OF THE INVENTION

The present invention relates to a vehicle for providing power to a plurality of power driven plant trimming tools, and more particularly to a self-propelled, self-steered vehicle that is adapted to steer itself automatically and draw a telescopic boom through a cultivated field, the boom including air lines for feeding compressed air to a plurality of manually controlled, pneumatically operated pruning devices. The invention also relates to an arrangement for removing moisture from air so that the formation of ice in the air lines is avoided.

DESCRIPTION OF THE PRIOR ART

Trimming of plants, vines, trees, and the like is performed to stimulate proper growth. Hand-operated pruning devices are often used to perform the trimming operations. However, the use of such manual devices is frequently tiring, and the trimming or pruning of large diameter branches is often quite difficult. Accordingly, a compressed-air-operated tree trimmer is disclosed in U.S. Pat. No. 4,347,880, which issued Sept. 7, 1982, to the inventor of the present invention. The device disclosed in that patent is a single cut trimming device that is extendable by adding a suitable number of tubes and rods.

U.S. Pat. No. 4,541,177 issued Sept. 17, 1985, to Brian Hollander, discloses a delimbing shear attachment for a movable boom mounted on a motorized or self-propelled vehicle having an operator's station, such as a cab or platform. The operator controls the movement of the boom and the application of hydraulic power to the delimbing shear attachment mounted on the end of the boom.

U.S. Pat. No. 4,411,070, issued Oct. 25, 1983, to George A. Boyum et al, discloses a tree trimming apparatus mounted on a mobile support vehicle. The apparatus includes a telescopic unit pivotally mounted on a pedestal. A large diameter circular saw is mounted at the end of the boom and is powered by a high-speed hydraulic motor to provide high cutting efficiency.

It is an object of the present invention to provide an improved, self-propelled vehicle for providing power to a plurality of manually controlled, power-operated pruning units to permit pruning to be accomplished simultaneously in a plurality of rows of plants.

SUMMARY OF THE INVENTION

Briefly stated, in accordance with one aspect of the present invention, a self-propelled, self-steered vehicle is provided for supplying power to a plurality of power driven plant trimming tools. The vehicle includes in one embodiment an engine supported by the vehicle frame and drivingly connected with a reel about which a cable is wound for winding the cable onto the reel. The cable is passed through a cable guiding element disposed at an end of a steering lever such that as the cable is wound onto the reel, the cable guiding element cooperates with the cable to orient the steering lever to steer the vehicle towards an anchored end of the cable.

In another embodiment, the vehicle is steered by feelers extending laterally outwardly of the vehicle and pivotally attached to a steered wheel carrier. When one of the feelers contacts a fixed object, the feeler pivots relative to the carrier and a ratchet catch disposed on the feeler engages a sprocket which in turn causes another sprocket to turn the steered wheel of the vehicle away from the fixed object.

According to another aspect of the invention, the engine and compressor means supporting frame of the vehicle comprises tubes fitted with moisture removing baffles. Pressurized gas from the compressor means is passed through the tubes, and the baffles trap moisture in the pressurized gas to minimize the moisture content of the pressurized gas.

BRIEF DESCRIPTION OF THE DRAWINGS

FIG. 3 is an enlarged side view of the self-steering mechanism of the vehicle illustrated in FIG. 1.

FIG. 4 is a top view of the self-steering mechanism of the vehicle illustrated in FIG. 1.

FIG. 6 is a side view of a portion of the vehicle illustrated in FIG. 5 as seen in the direction indicated by line 6—6.

DESCRIPTION OF THE PREFERRED EMBODIMENTS

Figures 1, 7:
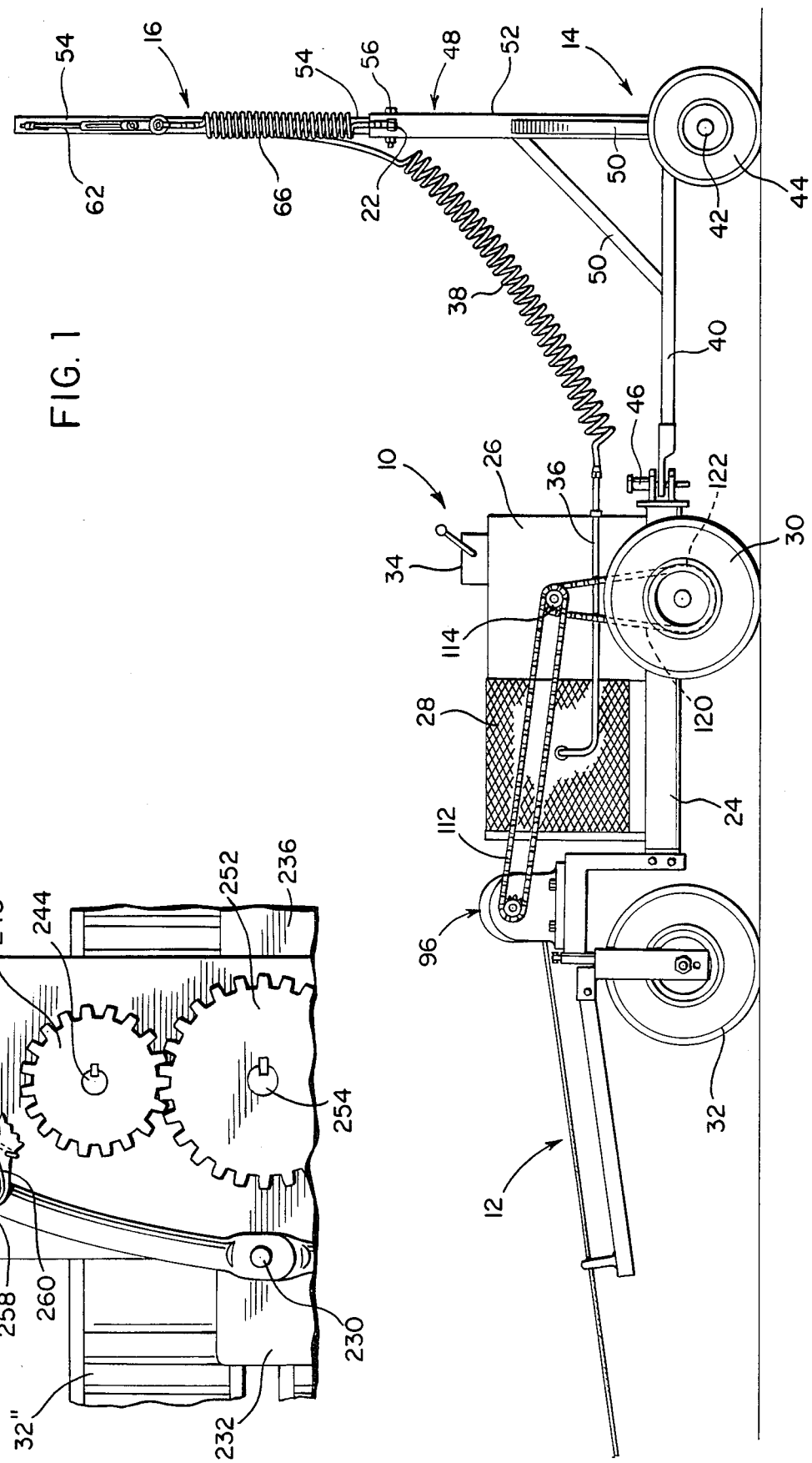
FIG. 1 is a side view of a self-propelled, self-steered plant trimming apparatus in accordance with the present invention.
FIG. 7 is an enlarged view of a portion of the self-steering mechanism of FIG. 5.
Figure 2:
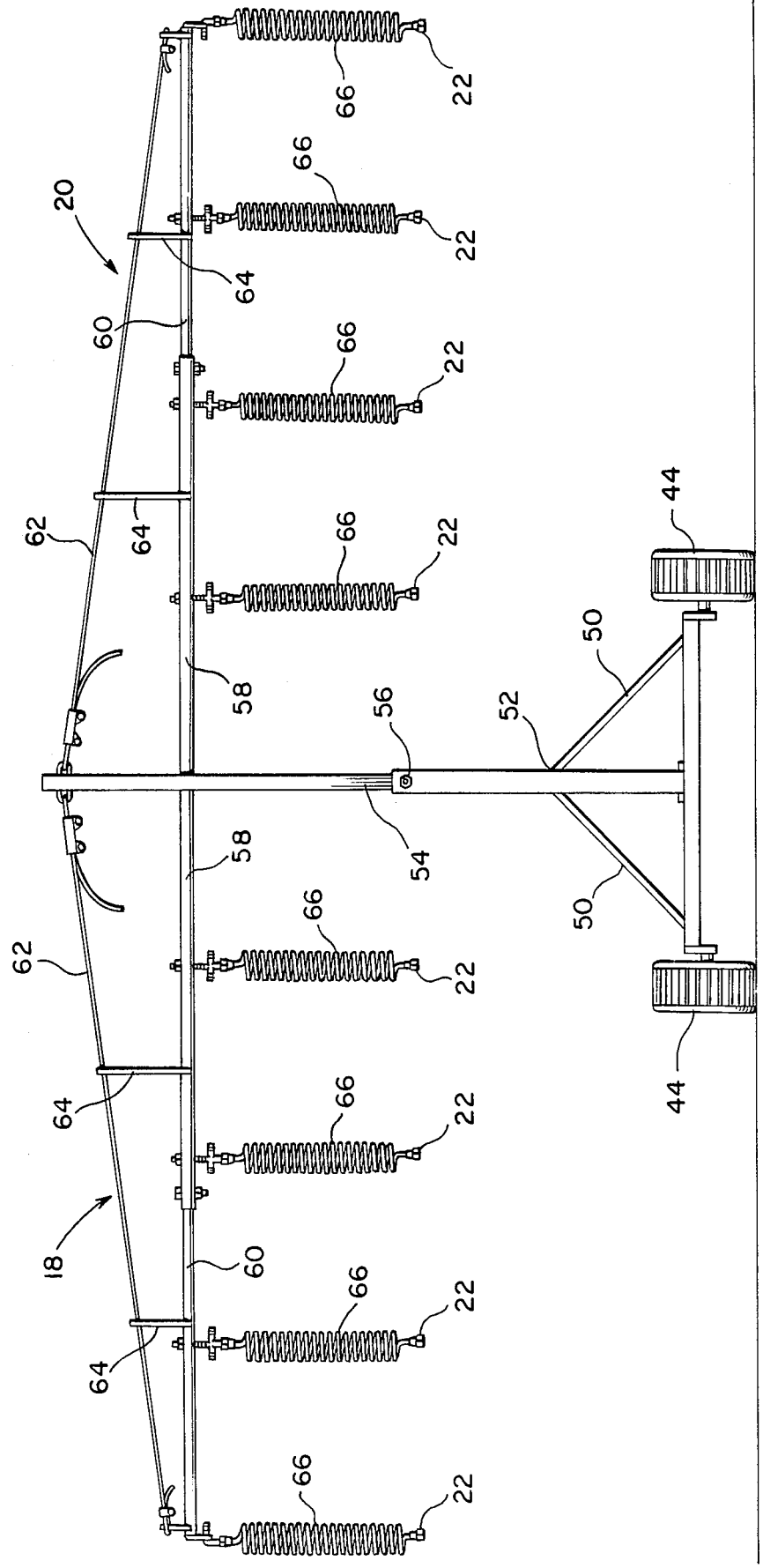
FIG. 2 is a rear end view of the apparatus of FIG. 1, showing the structural arrangement of a carrier for supporting a plurality of connections for individual plant trimming tools.

Referring now to the drawings, and particularly to FIGS. 1 and 2 thereof, there is shown a self-propelled vehicle 10 that includes a self-steering mechanism 12 at its forward end, and that draws a wheeled trailer 14 that carries a supporting structure 16 including a pair of laterally extending telescopic arms 18, 20 that support a plurality of connectors 22, each adapted to connect with a respective power operated trimming tool (not shown), such as a pruning device of the type disclosed in my U.S. Pat. No. 4,347,880, issued Sept. 7, 1982, the disclosure of which patent is incorporated herein by reference.

Vehicle 10 includes a frame 24 that supports an engine 26 and a power source 28 to operate the trimming tools. A pair of driving wheels 30 are supported at one end of frame 24, on opposite sides thereof, and a steered wheel 32 is provided at the opposite end of frame 24. Engine 26 can be any convenient source of rotary power, such as a gasoline or diesel engine, and includes a throttle or speed control means 34 for permitting the speed of vehicle 10 to be set at any predetermined speed value.

Power source 28 for trimming tools of the type disclosed in my U.S. Pat. No. 4,347,880 is preferably an air compressor driven by engine 26 and including a pressure outlet 36 that communicates with a coiled main conduit 38 to carry compressed air to the respective connectors 22 carried by trailer 14. Alternatively, if desired, power source 28 can be an hydraulic pump, in order to provide pressurized hydraulic fluid at the respective connectors 22 for hydraulically operated trimming tools, or power source 28 can be an electric generator driven by engine 26 for providing electrical power at connectors 22 to operate electrically powered trimming tools.

Trailer 14 includes a frame 40 that carries an axle 42 to rotatably support a pair of spaced wheels 44. Trailer 44 is suitably connected with vehicle 10 by means of a connecting pin 46 or the like, or any other suitable connection as is well known to those skilled in the art. Frame 40 supports a vertically extending boom 48, which is secured to frame 40 by braces 50. Boom 48 preferably has a tubular structure that includes an outer tube 52 and an inner tube 54 that slidably extends within outer tube 52 to provide a telescopic structure. Outer tube 52 includes a pair of aligned openings to receive a positioning pin 56, and inner tube 54 includes a plurality of pairs of aligned openings that are spaced along the axis thereof to permit vertical adjustment and positioning of inner tube 54 with respect to outer tube 52 at a desired height, depending upon the height of the plants between which the apparatus is intended to pass.

Referring more specifically to FIG. 2, inner tube 54 carries a pair of axially aligned outwardly extending arms 18, 20 from which the respective connectors 22 extend. Arms 18 and 20 are also preferably telescopic in a manner similar to the vertical boom 48, and each arm includes an outer tube 58 secured to inner tube 54 of vertical boom 48, and an inner tube 60 that is axially slidable within outer tube 58. An aperture and pin arrangement similar to that of boom 48 is provided on arms 18 and 20 to secure the inner and outer tubes thereof in a desired position to provide the desired lateral extension. Additionally, adjustable length guy wires 62 extend from the outermost ends of the respective inner tubes 60 to the topmost end of the vertical boom inner tube 54 for additional support for arms 18 and 20. Further, intermediate supports 64 can be provided as needed, depending upon the length of the telescopic arms.

Extending downwardly from each of telescopic arms 18 and 20 are a plurality of connectors 22, that are provided at the lowermost ends of coiled branch conduits 66 supported by the telescopic arms. Coiled branch conduits 66 are preferably carried on rings (not shown), or the like, that are slidable along telescopic arms 18 and 20 to a desired position. Additionally, coiled branch conduits 66 communicate with main conduit 38 to provide a direct communication path between power source 28 and connectors 22, to thereby permit the desired number of power operated trimming tools to be attached to the device. Although in its preferred form the apparatus includes trailer 14 for supporting the respective connectors 22, it would be apparent to those skilled in the art that boom 48 and its associated connector supporting structure could also be provided on vehicle 10 itself, if desired.

Steered wheel 32 is rotatably mounted by an axle 70 to a steered wheel carrier designated generally by 82, as should be apparent from FIG. 3. The steered wheel carrier includes steering wheel yoke 84 which rotatably carries steered wheel 32 on axle 70. Steering wheel yoke 84 includes a vertically extending shaft 86 disposed thereon which is rotatably received in a vertically extending sleeve 88 secured to one end of horizontally disposed connecting table 90. Secured to the opposite end of table 90 are vertical connecting bars 92 for attachment to vehicle frame 24 by means of bolts 94 or the like. Table 90 thus interconnects self-steering mechanism 12 and frame 24.

Bolted or otherwise fixed to the planar top surface of connecting table 90 is a winch 96 including reel 98 about which cable 100 is wound. Cable 100 is anchored to any desired object or to the ground at its unwound end (not shown) at a distance of roughly 600 feet from reel 98. As the cable is wound up onto reel 98, vehicle 10 is driven toward the anchored end of cable 100. As shown in FIG. 1, power is supplied to driving wheels 30 by an endless chain 120 disposed about rotary output shaft 114 and sprocket 122; it should be understood, however, that any suitable arrangement for transmission of power from engine 26 to driving wheels 30 could be used.

Steering wheel yoke 84 carries on its top surface a bracket 102 which supports a horizontally extending pin 104 passing through an end of a steering lever 106 to define a horizontal pivot axis about which the steering lever 106 can pivot. At the end of steering lever 106 opposite the end through which pin 104 passes is disposed a cable guiding element 108 which may be, for example, an eye or hook type fixture. Thus, as cable 100 is wound up onto reel 98, cable guiding element 108 will cause steering lever 106 to constantly orient itself towards the unwound end of cable 100 which is anchored to the ground or to any object toward which vehicle 10 is to move.

Reel 98 of the winch is integrally formed with or otherwise affixed to central axle 110 for rotation about the central axis of the reel. Disposed about the exterior of one end of axle 110 is an endless belt or chain 112 which is also disposed about a rotary output shaft 114 of engine 26. Thus, winch 96 is driven off the same engine 26 as power source 28 and driving wheels 30. Axle 110 of the winch is mounted on table 90 for rotation by winch frame 116.

In operation, support structure 16 for connectors 22 is set at the desired height and lateral extension, depending upon the height and spacing of the plants that are intended to be trimmed. After the unwound end of cable 100 has been anchored to the ground, engine 26 of vehicle 10 is started, and speed control 34 is set for the desired vehicle forward speed.

The start-up of engine 26 drives a power source 28, such as an air compressor, for the trimming tools. Compressed air is provided to the several connectors 22 that depend from telescopic arms 18 and 20. The operators of the respective trimming tools can connect their tools to the connectors 22, and can perform the necessary trimming operations as the vehicle proceeds in the direction of cable 100, without operator attention, at the desired speed. The desired speed is normally between 7 and 10 feet per minute.

As earlier noted, steering lever 106 is constantly oriented toward the unwound end of cable 100 which is anchored to any desired object or to the ground. Wheel 32 is thus steered in such a way that vehicle 10 follows the entire unwound length of cable automatically and while unattended. When the length of the cable has been traversed, the end of the cable may be moved and anchored at another location, cable 100 may be unwound from reel 98 and the operation outlined above may be repeated until an entire field, orchard or vinyard has been trimmed.

Figure 5:
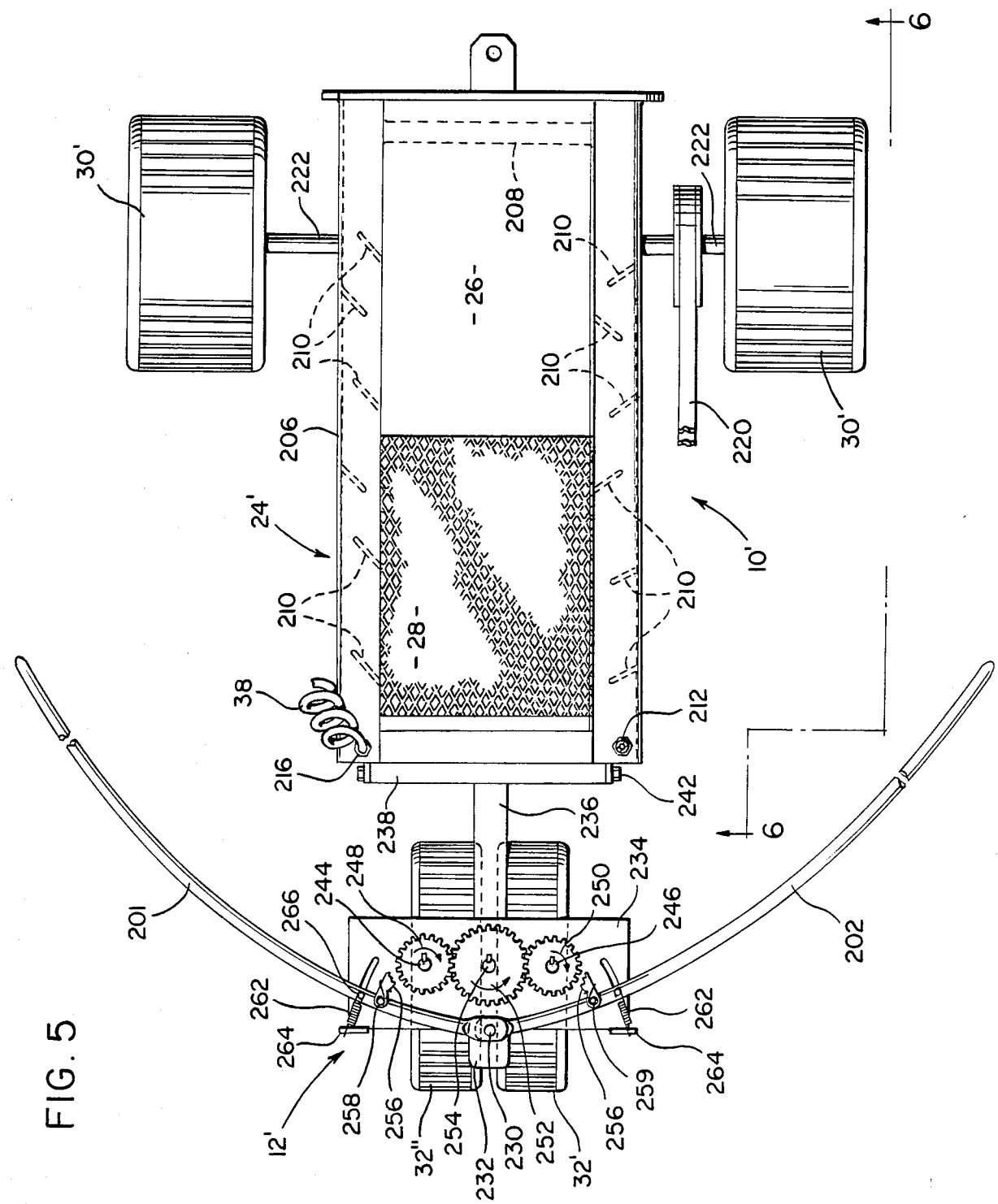
FIG. 5 is a view of a vehicle with second self-steering mechanism in accordance with the present invention as seen in the direction indicated by line 5—5 of FIG. 6.

Referring now to FIGS. 5–7, a modified embodiment of the self-propelled vehicle portion of the invention, designated 10', is illustrated. This particular embodiment includes both a novel self-steering mechanism 12' and a novel frame 24' supporting an engine 26 and a power source 28 in any suitable manner. The self-propelled vehicle portion 10' is used in conjunction with the wheeled trailer 14 in the same manner as previously described self-propelled vehicle portion 10, with the engine and power source supplying compressed air or gas via a main conduit 38 to connectors 22. In this embodiment, however, steering of the vehicle 10' is accomplished by feelers 201, 202 extending outwardly of the self-propelled vehicle portion rather than by the use of a cable. Also in this embodiment, frame 24' is constructed as a unique moisture condensing system to remove moisture from pressurized air or gas prior to use of the pressurized air or gas to operate the trimming tools.

Frame 24' comprises two elongated steel tubes 204, 206 disposed parallel to one another and connected togther at adjacent ends thereof by a bridge tube 208. The steel tubes preferably have an outer diameter ranging anywhere from 3 to 6 inches and a wall thickness of approximately 3/16 inch. Each of the elongated steel tubes 204, 206 are fitted with baffles 210 to trap and remove moisture from compressed air passing through the tubes as will presently be described.

The power source 28, which preferably is an air compressor as set forth above, has connected to the pressurized air or gas outlet 211 thereof a roughly ¼" to ⅜" diameter copper conduit 212. Fast cooling of pressurized air or gas, which is heated by its compression in the power source 28, will take place in copper conduit 212. Conduit 212 passes adjacent a specially designed flywheel 213, mounted rotatably either on frame 24' or power source 28 and including fan blades 214. The flywheel 213 is driven by rotary output shaft 114 via belt 215. As flywheel 213 rotates, fan blades 214 force air to pass over conduit 212 to quickly cool pressurized air flowing through conduit 212. This fast cooling will cause moisture to condense out of the compressed air or gas.

The cooled, compressed gas is led by copper coil conduit 212 to one end of first tube 204. Because tube 204 has a larger inner cross sectional area than conduit 212, the compressed gas is caused to expand. The gas passes into tube 204 and sequentially through the tube 204, connecting tube 208 and tube 206, and exits through outlet 216 provided in tube 206. Outlet 216 communicates with coiled main conduit 38 to carry compressed gas to the respective connectors 22 carried by trailer 14 as previously described.

Baffles 210 fitted within the steel tubes 204, 206 trap moisture condensed from the compressed gas after it has been cooled in the copper conduit 212. The trapped moisture may be drained in any suitable way from the interior of the tubes 204, 206 such as, for example, through drain petcocks fitted to the underside of the tubes.

Through the use of frame 24' including tubes 204 and 206, a unique moisture removal system is provided. Since pruning is often done when the ambient air temperature is at or below the freezing temperature of water, it is desirable to minimize the moisture content of the compressed gas which is used to operate the trimming tools so that the presence of ice in the connecting air conduits and freeze up of the air operated trimming tools is avoided.

Wheels 30' in this embodiment are again driven by engine 26 in any suitable manner; in FIG. 6, the drive mechanism is shown as including an endless chain or belt 220 driven, via variable speed transmission device 221, by rotary output shaft 114 of engine 26. The chain or belt 220 in turn drives axle 222, thereby rotating wheels 30' affixed thereto. Wheels 30' thus again constitute drive wheels which are driven by rotary output shaft 114 of the engine.

In the embodiment of FIGS. 5-7, winch 96 is not present. The novel self-steering mechanism illustrated in FIGS. 5 and 7 includes feelers 201 and 202 as noted above instead. Feelers 201 and 202 are attached together at adjacent pivoting ends by a pin 230 which forms an axis about which feelers 201 and 202 pivot. Pin 230 passes through the pivoting ends of feelers 201 and 202 and into an extension 232 of base plate 234 which is fixed to an end of horizontal connecting bar 236 by welding or the like. Base plate 234 forms a carrier for steerable wheels 32', 32" as will presently be described. Connecting bar 236 has at its end opposite that to which base plate 234 is fixed a transversely extending connecting bar 238. At both ends of connecting bar 238 is a vertical connecting bar 240 as seen in FIG. 6. Each connecting bar 240 is attached to frame 24' by connectors 242, which may be screws, for example.

Base plate 234 has two pins 244, 246 fixed thereto and extending upwardly from the top planar surface thereof. Sprockets 248, 250 are mounted for rotation on the top planar surface of base plate 234 about pins 244, 246. Disposed beteween sprockets 248, 250 and including teeth intermeshed with the teeth of the sprockets 248, 250 is a third sprocket 252 which is keyed or otherwise positively connected to a shaft 254. Shaft 254 passes through base plate 234 and is integrally formed with or otherwise positively connected to the central portion of an axle extending between steerable wheels 32' and 32" about which axle the wheels rotate.

A ratchet 256 is pivotally connected to each feeler 201 and 202 via pin 258 affixed to feeler 201 and pin 259 affixed to feeler 202. Ratchet catches 256 are oriented in a rest position as shown in FIGS. 5 and 7 by any suitable means; in FIG. 7, centering a spring 260 is shown as maintaining the ratchet catch 256 on feeler 201 in its rest position. Ratchet catch 256 on feeler 202 is similarly oriented and maintained in its rest position.

Referring to FIG. 7, the cooperation between feeler 201 and other elements of the novel self-steering mechanism 12' will be apparent. It should be clear that feeler 202, which is not shown in FIG. 7 for the sake of simplicity, cooperates with elements of the self-steering mechanism in an identical fashion. Feeler 201 is spring biased about pin 230 by tension spring 262. Tension spring 262 is stretched between upstanding spring hold back tab 264 integrally formed with base plate 234 and an upwardly extending portion of a vertically oriented pin 266 passing through feeler 201. Pin 266 also includes a portion extending downwardly into a opening or slot 268 formed in base plate 234. Opening 268 both guides and limits the pivotal movement of feeler 201 about pin 230 by cooperation of pin 266 with the opening.

Referring now to FIGS. 5 and 7, as self-propelled vehicle 10' moves forwardly along the ground, it may pass a fixed object, such as a tree or shrub. Feelers 201 and 202 of self steering mechanism 12' are designed to prevent the vehicle from passing to closely to such a fixed object.

If either feeler 201 or feeler 202 contacts a fixed object, it will be caused by such contact to pivot in a direction away from tabs 264. Referring specifically to FIG. 7, the cooperation between feeler 201 and the other elements of self-steering mechanism 12' will now be described, it being understood that feeler 202 cooperates in a similar manner with the elements of the self-steering mechanism.

Prior to contacting a fixed object, feeler 201 is biased by tension spring 262 into an initial position. The feeler 201 is retained in this initial position via abutment of the downwardly extending portion of pin 266 with an end of opening 268 under the force of the tension spring. After contacting a fixed object, feeler 201 is pivoted in a clockwise direction, as seen in FIG. 7, about pin 230. Tension spring 262 is stretched as a result of its cooperation with pin 26, thereby providing a restoring force on feeler 201 which tends to cause the feeler to pivot in the counterclockwise direction as seen in FIG. 7 about pin 230 and back into its initial position.

Ratchet catch 256, which is pivotally mounted on feeler 201, is moved inwardly toward sprocket 248 by feeler 201 as it pivots. Upon sufficient pivotal movement of feeler 201, the toothed end of ratchet catch 256 will engage the teeth of sprocket 248. Further pivotal movement of feeler 201 will then force ratchet catch 256 to pivot in a counterclockwise direction about pin 258 against the force of centering spring 260 while simultaneously forcing sprocket 248 to rotate in a clockwise direction about 244. Clockwise rotation of sprocket 248 in turns causes counterclockwise rotation of sprocket 252 because of the toothed engagement therebetween. Sprocket 252, being positively connected to shaft 254, causes shaft 254 to also rotate in the counterclockwise direction. Since shaft 254 is integrally formed with or otherwise positively connected to the central portion of the axle of wheels 32' and 32", it causes the wheels to turn and steer the self-propelled vehicle 10' away from the fixed object contacted by feeler 201. After the self-propelled vehicle has moved away from the fixed object, feeler 201 will no longer contact the fixed object and will be returned to its initial position under the force of tension spring 262.

It should be apparent from FIG. 5 that feeler 202 cooperates in an identical manner with sprocket 250 whenever feeler 202 contacts a fixed object.

It is thus possible for operators of respective trimming tools to connect their tools to the connectors 22 and perform the trimming operations as the vehicle 10' proceeds, without operator attention, in the direction determined by the orientation of wheels 32' 32". Feelers 201, 202 automatically keep wheels 32', 32" properly oriented. Self-propelled vehicle 10' is particularly useful when adjacent rows of vines, trees or shrubs must be trimmed, Feelers 201, 202 will automatically maintain proper alignment of the self-propelled vehicle between the rows as the vehicle advances such that the vehicle will not be propelled into one of the rows.

Although particular embodiments of the present invention have been illustrated and described, it will be apparent to those skilled in the art that various changes and modifications can be made without departing from the spirit of the present invention. It is therefore intended to encompass in the appended claims all such changes and modifications that fall within the scope of the present invention.

What is claimed is:

1. A self-propelled, self-steered vehicle for supplying power to a plurality of power driven plant trimming tools, comprising:

(a) a wheeled vehicle having a pair of driving wheels mounted on a vehicle frame, a steered wheel rotatably mounted on a steered wheel carrier, said steered wheel carrier mounted at one end of the vehicle and pivotal about a vertical axis, an engine supported by the vehicle frame, driving said pair of driving wheels, a reel mounted for rotation on a winch frame, said winch frame mounted on connecting means which interconnects said steered wheel carrier and said vehicle frame, said engine also causing the reel to rotate so that a cable having a wound end secured to said reel is wound onto said reel, said cable anchored at an unwound end thereof opposite said wound end so that as said engine drives said reel, said cable is wound onto said reel to propel said vehicle, speed control means for controlling the speed of the vehicle, and a tool power source driven by the engine for providing power to a plurality of plant trimming tools;

(b) steering means connected to the steered wheel, said steering means including a steering lever pivotally connected at one end to said steered wheel carrier, a cable guiding element, through which said unwound end of said cable has been passed, disposed at an opposite end of said steering lever, wherein as said cable is wound onto said reel to propel said vehicle, the cable guiding element cooperates with said cable to constantly orient said steering lever towards the anchored end of said cable to steer said steered wheel so that said wheeled vehicle automatically follows the entire unwound length of said cable; and (c) carrier means connected with said vehicle for carrying a plurality of conduits communicating with said tool power source to supply power to a plurality of individual plant trimming tools connected to the conduits.

2. A self-propelled, self-steered vehicle as defined in claim 1, wherein said steering lever pivots about a horizontal axis relative to said steered wheel carrier.

3. A self-propelled, self-steered vehicle as claimed in claim 1, wherein the carrier means include a supporting structure, and conduit means carried by the supporting structure and in communication with the tool power source, the conduit means terminating in a plurality of connectors to which plant trimming tools are adapted to be connected.

4. A self-propelled, self-steered vehicle as claimed in claim 1, wherein the steered wheel is rotatably carried on a steering wheel yoke and the steering lever is pivotally connected to the steering wheel yoke for pivotal movement about a substantially horizontal axis.

5. A self-propelled, self-steered vehicle as claimed in claim 4, wherein the steering wheel yoke is pivotally carried by a connecting means secured to the vehicle.

6. A self-propelled, self-steered vehicle as claimed in claim 3, wherein the supporting structure includes a central, upstanding boom.

7. A self-propelled, self-steered vehicle as claimed in claim 6, wherein the boom carries a pair of outwardly extending arms each supporting at least one branch conduit and connector.

8. A self-propelled, self-steered vehicle as claimed in claim 7, wherein the boom is telescopic for permitting vertical adjustment of the positions of the arms.

9. A self-propelled, self-steered vehicle as claimed in claim 7, wherein the arms are telescopic for lateral adjustment of the positions of the branch conduits.

10. A self-propelled, self-steered vehicle as claimed in claim 3, wherein the carrier means is supported on a trailer detachably connected with the vehicle at an end opposite to an end at which the steered wheel is mounted, and the trailer is adapted to be drawn by the vehicle.

11. A self-propelled, self-steered vehicle as claimed in claim 1, wherein the tool power source includes compressor means for providing a pressurized gas for operating pneumatic trimming tools.

12. A self-propelled, self-steered vehicle as claimed in claim 11, wherein the compressor means is drivingly connected with the engine.

13. A self-propelled, self-steered vehicle as claimed in claim 1, wherein the plant trimming tools are fluid pressure operated cutting devices.

14. A self-propelled, self-steered vehicle for supplying power to a plurality of power driven plant trimming tools, comprising:
   (a) a wheeled vehicle having a pair of driving wheels, steered wheels rotatably mounted on a steered wheel carrier, said steered wheel carrier mounted at one end of the vehicle, an engine supported by the vehicle and drivingly connected with the driving wheels for propelling the vehicle along the ground, speed control means for controlling the speed of the vehicle, and a tool power source driven by the engine for providing power to a plurality of plant trimming tools;
   (b) steering means connected to the steered wheel, said steering means including feelers pivotally attached to said steered wheel carrier, each of said feelers having a ratchet catch disposed thereon;
   a first sprocket spaced from and engagable with one of the ratchet catches and a second sprocket spaced from and enagagable with the other of the ratchet catches, said first and second sprockets mounted for rotation on said steered wheel carrier;
   a third sprocket positively connected to an axle extending between said steered wheels, said third sprocket including teeth intermeshed with teeth of said first and second sprockets;
   said feelers extending laterally outwardly of said wheeled vehicle to contact fixed objects, one of said feelers pivoting from an initial position relative to said steered wheel carrier upon contact of said one of said feelers with a fixed object, the ratchet catch disposed on said one of said feelers moving toward and engaging one of said first and second sprockets as said one of said feelers pivots to cause said one of said first and second sprockets to rotate said third sprocket, said third sprocket turning said steered wheels and steering the self-propelled, self-steered vehicle away from said fixed object;
   (c) carrier means connected with said vehicle for carrying a plurality of conduits communicating with said tool power source to supply power to a plurality of individual plant trimming tools connected to the conduits.

15. A self-propelled, self-steered vehicle as defined in claim 14, wherein each of said feelers is biased into its initial position by spring means.

16. A self-propelled, self-steered vehicle as defined in claim 14, wherein the carrier means include a supporting structure, and conduit means carried by the supporting structure and in communication with the tool power source, the conduit means terminating in a plurality of connectors to which plant trimming tools are adapted to be connected.

17. A self-propelled, self-steered vehicle as claimed in claim 16, wherein the tool power source includes compressor means for providing a pressurized gas for operating pneumatic trimming tools.

18. A self-propelled, self-steered vehicle as claimed in claim 17, wherein the compressor means is drivingly connected with the engine.

19. A self-propelled, self-steered vehicle as claimed in claim 17, wherein said engine and said compressor means are supported by a supporting frame comprising steel tubes, at least some of said steel tubes fitted with baffles, said pressurized gas passing through a conduit leading from said compressor means to one of said steel tubes, moisture in said pressurized gas condensing out of said pressurized gas as it passes through said conduit, said pressurized gas thereafter passing through said steel tubes and to said conduit means carried by the supporting structure, said baffles trapping said moisture as said pressurized gas passes through said tubes.

* * * * *